United States Patent [19]

Burge et al.

[11] Patent Number: 5,127,794
[45] Date of Patent: Jul. 7, 1992

[54] COMPRESSOR CASE WITH CONTROLLED THERMAL ENVIRONMENT

[75] Inventors: Joseph C. Burge, Palm Beach Gardens; Richard J. Tiernan, Jr., Hobe Sound, both of Fla.

[73] Assignee: United Technologies Corporation, Hartford, Conn.

[21] Appl. No.: 581,220

[22] Filed: Sep. 12, 1990

[51] Int. Cl.$^5$ ............................................. F01D 11/00
[52] U.S. Cl. ..................................... 415/173.3; 415/177
[58] Field of Search ............... 415/173.1, 173.2, 173.3, 415/126, 127, 134, 138, 177, 108

[56] References Cited

U.S. PATENT DOCUMENTS

| | | | |
|---|---|---|---|
| 3,412,977 | 11/1968 | Moyer et al. | 415/173.1 |
| 3,966,354 | 6/1976 | Patterson | 415/173.1 |
| 4,101,242 | 7/1978 | Coplin et al. | 415/134 |
| 4,127,357 | 11/1978 | Patterson | 415/138 |
| 4,543,039 | 9/1985 | Ruis et al. | 415/173.1 |
| 4,778,337 | 10/1988 | Popp | 415/138 |

*Primary Examiner*—Edward K. Look
*Assistant Examiner*—Michael S. Lee
*Attorney, Agent, or Firm*—Norman Friedland

[57] ABSTRACT

The thermal environment to which the engine's compressor case is subjected is controlled and the coefficient of expansion selected for the stator and rotor components are suitably matched to improve engine performance by reducing radial clearances during part power engine operations. A thermal barrier around the engine case by virtue of a heat shield attached to the customary case flanges and the coaxially mounted spaced stator vanes forming an inner case defining cavities sandwiching the engine case and holds the metal temperature at a value higher than would otherwise be provided. The thermal barrier serves to isolate the outer case from the engine's fan discharge air and the engine's core gas path.

2 Claims, 3 Drawing Sheets

COMPRESSOR CASE WITH CONTROLLED THERMAL ENVIRONMENT

CROSS REFERENCE

The subject matter of this application is related to the subject matter of the following commonly assigned patent applications: U.S. application Ser. No. 07/581,223 entitled "Fastener For Multi-Stage Compressor"; U.S. application Ser. No. 07/581,224 entitled "Fastener Mounting For Multi-Stage Compressor"; U.S. application Ser. No. 07/581,231 entitled "Case Tying Means For A Gas Turbine Engine"; U.S. application Ser. No. 07/581,230 entitled "Compressor Bleed"; U.S. application Ser. No. 07/581,229 entitled "Segmented Stator Vane Seal"; U.S. application Ser. No. 07/581,228 entitled "Backbone Support Structure For Compressor"; U.S. application Ser. No. 07/581,227 entitled "Compressor Case Construction With Backbone"; U.S. application Ser. No. 07/581,219 entitled "Compressor Case Construction"; U.S. application Ser. No. 07/581,240 entitled "Compressor Case Attachment Means"; all of the above filed on even date herewith.

TECHNICAL FIELD

This invention relates to gas turbine engines and more particularly to the construction of the compressor section.

BACKGROUND ART

As is well known, the compressor case of a gas turbine engine powering aircraft is subjected to severe pressure and temperature loadings throughout the engine operating envelope and care must be taken to assure that the components remain concentric maintaining relatively close running clearances so as to avoid inadvertent rubs. Inasmuch as the engine case is thin relative to the rotor and stator components in the compressor section, it responds more rapidly to temperature changes than do other components. This is particularly true during periods of transient engine performance. Typical of these transients are throttle chops, throttle bursts, bodies and the like. Obviously it is customary to provide sufficient clearances during these transients to assure that the rotating parts do not interfere with the stationary parts.

In certain installations that utilize the axial split case it was necessary to utilize a full hoop case for the highest stages of a multiple stage compressor in order to attain adequate roundness and concentricity to achieve desired clearance between the rotating and non-rotating parts. Since the stator components, i.e., stator vanes and outer air seals are segmented, the problem was to assure that the compressor maintained its surge margin notwithstanding the fact that the outer case would undergo large deflection at acceleration and deceleration modes of operation. The cavity that exists between the outer case and the inner case formed by the segmented stator components, being subjected to pressures occasioned by the flow of engine air through the various leakage paths, presented a unique problem. In the event of a surge, the pressure in the gas path would be reduced significantly. Because the air in the cavity is captured and cannot be immediately relieved, it would create an enormous pressure difference across the stator components, cause them to distort, with a consequential rubbing of the compressor blades, and a possible breakage.

In order to withstand this pressure loading and yet achieve the roundness and clearance control of the stationary and rotating components it was necessary to incorporate a mechanism that would tie the outer case to the segmented stator components.

Moreover, since the outer case, due to temperature changes grows and shrinks faster than the rotor, the full hoop tied case as described, presented an even severer problem than would otherwise be encountered imposing on the engine designer a difficult task to assure that the clearance between the tips of the compressor blades and its outer air seal is adequate without imparting a penalty to the overall engine's performance.

We have found that we can improve on the control of the gap clearances by providing quasi-controlled thermal environment for the outer case. By virtue of this invention, the outer case is thermally isolated such that the temperature of the case is at a higher value than it would otherwise be which inherently increases the radial growth of the stator components during engine operation. The thermal isolation also slows the casing response to main gas path transient temperature changes. These aspects, together with the judicious selection of the proper coefficient of thermal expansion of the material used in the engine casing enhances the growth match-up of the stator and the rotor resulting in reduced radial clearances during part power engine operation which in turn improves compressor stability margins and engine operating efficiencies.

STATEMENT OF THE INVENTION

An object of this invention is to provide for a gas turbine engine improved clearance control of the clearance between the compressor rotor blades and its outer air seal.

A feature of this invention is to provide a heat shield surrounding the outer surface of the compressor outer case so that it together with the segmented stator supported to the outer case, thermally isolates the outer case from the gas path and fan discharge air.

The foregoing and other features and advantages of the present invention will become more apparent from the following description and accompanying drawings.

BEST MODE FOR CARRYING OUT THE INVENTION

Figure 1:
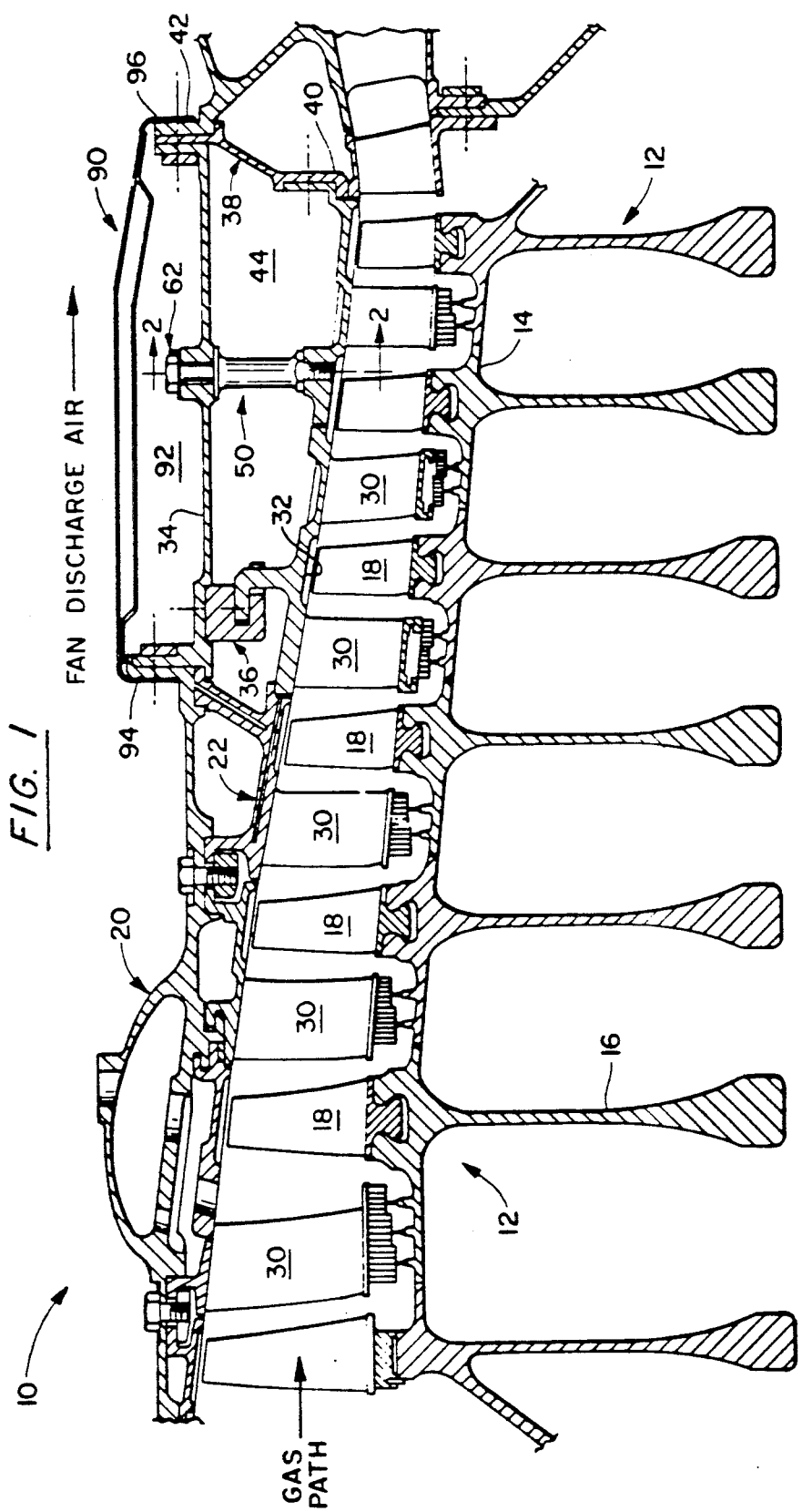
FIG. 1 is a partial view partly in section and partly in elevation of a multi-stage axial flow compressor for a gas turbine engine.
Figure 2:
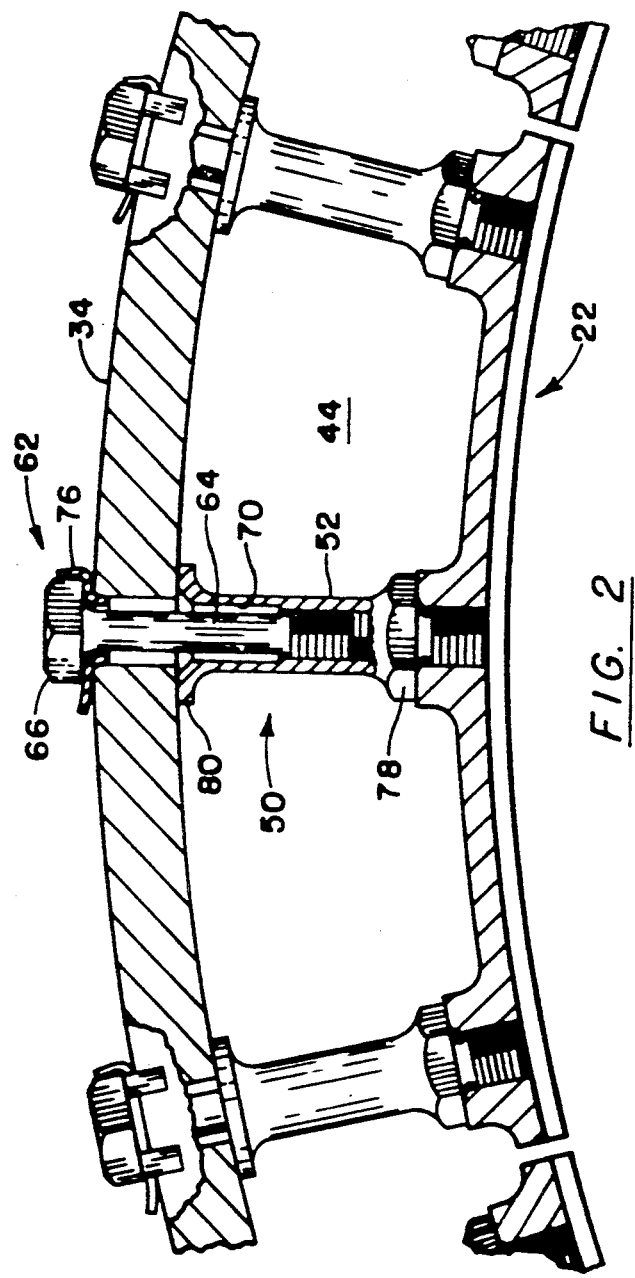
FIG. 2 is a partial sectional view partly in schematic taken along lines 2—2 of FIG. 1 showing one of several segments of the components making up the inner case.
Figure 3:
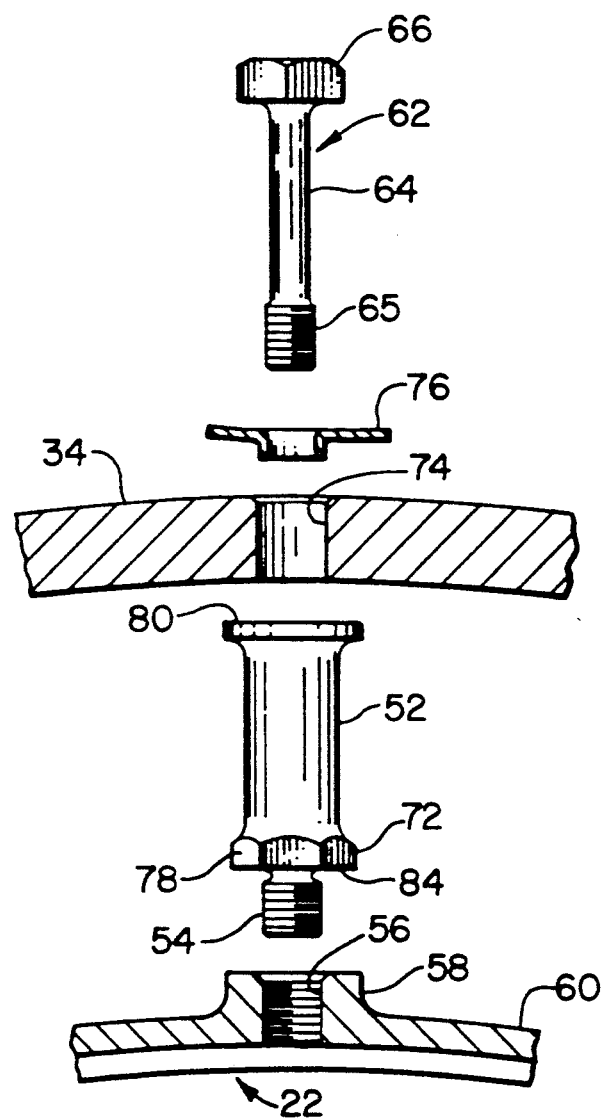
FIG. 3 is an exploded view showing the details of this invention.

FIGS. 1, 2 and 3 illustrate only a portion of a multi-stage compressor for a gas turbine engine of the type for powering aircraft that is necessary to illustrate the invention. For more details of a gas turbine engine the F100 family of engines manufactured by Pratt & Whitney, a division of United Technologies Corporation, the assignee of this patent application, is incorporated herein by reference. Suffice it to say that in the preferred embodiment the engine on which this invention is being utilized is a fan-jet axial flow compressor multi-spool type. As noted in FIG 1. the compressor section generally indicated by reference numeral 10 is comprised of a plurality of compressor rotors 12 retained in drum rotor 14, where each rotor includes a disk 16 supporting a plurality of circumferentially spaced compressor blades 18. The rotors 12 are suitably supported in an outer engine case 20 and an inner case 22.

In this configuration a portion of the outer case 20 is fabricated in two axial circumferential halves and the other portion is fabricated in a full hoop generally cylindrically shaped case. In FIG. 1 the first four lower pressure stages as viewed from the left hand side are housed in the split case and the last three stages are housed in the full case.

Inasmuch as this invention pertains to the aft section (full case) of the compressor, for the sake of simplicity and convenience only the portion of the compressor dealing with the full case will be discussed hereinbelow. The inner case 22 which comprises the stator vanes 30 and outer air seal 32 are supported in the full case 34 via the dog-like connection 36 and the bulkhead 38 which carries suitable attaching flanges 40 and 42.

As was mentioned above the problem associated with this construction is that the cavity 44 between the inner case 22 and outer case 34 is ultimately pressurized by the fluid leaking therein from the engine flow path. The engine flow path is defined by the annular passageway bounded by the inner surface of the inner case 22 and outer surface of drum rotor 14. This pressure can reach levels of 5–600 pounds per square inch (PSI). Should a surge situation occur, the pressure level in the gas path can reduce instantaneously to a value much lower than the 5–600 PSI and since the pressure in cavity 44 is trapped and can only be reduced gradually, an enormous pressure differential exists across inner case 22.

The spool/bolt arrangement generally illustrated by reference numeral 50 ties the inner case 22 to outer case 34 in such a manner as to enhance fatigue life and provide sufficient strength to withstand the compressor surge problems. Spool/bolt 50 comprises a spool member 52 having a reduced diameter threaded portion 54 at its lower extremity adapted to be threaded onto the complementary internal threads 56 formed in boss 58 extending radially from the outer surface 60 of inner case 22.

The bolt 62 comprises a relatively long shank 64 carrying threads 65 at the lower extremity and a significantly large head 66. Head 66 may be hexagonally shaped and is thicker and has a larger diameter than otherwise would be designed for this particular sized shank. These unusual dimensions of the head serve to reduce the stress concentration and increase fatigue life of the head to shank fillet adjacent the head.

The bolt 62 fits into bore 70 centrally formed in spool 52 that terminates just short of the remote end of the entrance to the bore. The inner diameter of bore 70 is threaded to accommodate the threaded portion of bolt 62. The spool 52 carries a tool receiving portion 72 for threadably securing the spool to inner case 22.

In the assembled condition, the spool 52 is threaded to inner case 22 and the bolt 62 passing through opening 74 in the outer case 34 is threaded to the inner threads of the spool 52, until the head bears against the outer surface of outer case 34 or a suitable washer. Tab washer 76 may be employed to prevent the bolt from inadvertently retracting.

After the spool is torqued sufficiently to urge flange portion 78 to bear against inner case 22, the bolt 62 is sufficiently torqued so that the flange-like portion 80 bears against the surface of outer case 34. The amount of torque will depend on the particular application but it should be sufficient to keep spool 52 in compression throughout the operating range of the engine.

As is apparent from the foregoing, the spool serves as a compressed flange-like member thus reducing both bolt fatigue and surge stresses. This configuration resists fatigue loads occasioned by thermal axial deflection differences between outer case 34 and the segmented inner case 22.

Also apparent from the foregoing and mentioned above is this arrangement resists the radial loads occasioned by a surge when there is an instantaneous and nearly complete loss in compressor flow path pressure.

The spool 52 also makes the threads 54 that mates with the inner case 22 to be insensitive to fatigue loading because it is preloaded by the spool washer face 84 that bears against the inner case.

The thread sizes of threads 65 of bolt 62 and threads 54 of spool 52 are different (the threads 54 are specifically designed to be larger). Because the diameter of the spool threads 54 are larger it has a higher disassembly breakaway torque than bolt 62. Consequently, the bolt will, by design, loosen first.

As noted in FIG. 2 the outer case is fabricated into a full hoop (360°) and is tied to circumferentially segmented inner case that encircles the rotor. Three spool/bolt elements are discreetly disposed on each of the segments (only one being shown) such that a spool/bolt element is disposed at either end of the segment and the third is mounted intermediate these two. Since the segment has a tendency to flatten and because of the temperature gradient across its thickness, these end spools resist this flattening, thereby keeping the flow path symmetric, round and concentric.

The outer case 34 whose outer surface is exposed to the discharge flow from the fan (not shown) would conventionally be subjected to the high heat transfer rates of this fluid. The inner surface of case 34 would, save for the leakage control by the segmented inner case, be likewise subjected to the high heat transfer rate of the engine's gas path fluid. In accordance with this invention, the heat shield 90 is circumferentially disposed in spaced relationship with outer case 34 defining a cavity 92. The heat shield 90 may be segmented, say in two halves and extends axially from flanges 94 and 96 formed on the outer case support structure.

As is apparent from the foregoing the use of the inner case 22 and the outer heat shield 90 in combination isolates the outer structural case 34 from the combined main gas stream and fan gas stream high heat transfer rates. Since the inner case 22 is axially segmented, thermally isolating the outer structural wall slows the rate of change of the casing dimensions during transient engine operation, which more closely matches the rotor. This in turn reduces radial clearance changes during transients and improves compressor transient stability margins.

As mentioned earlier, thermally isolating the outer structural wall also increases the outer wall temperatures. This, in conjunction with selection of a high coefficient of thermal expansion material for the outer wall increases the stator radial thermal growths during engine operation. This allows an improved match-up with rotor growths, which reduces part engine power compressor radial clearances and improves compressor stability margins and efficiencies.

Although the invention has been shown and described with respect to detailed embodiments thereof, it will be understood by those skilled in the art that various changes in form and detail thereof may be made without departing from the spirit and scope of the claimed invention.

We claim:

1. For a gas turbine engine including a compressor having an outer case, said outer case being a full hoop, stator vanes having an outer wall means defining an inner case being in coaxial relationship with said outer case and being spaced therefrom, a metal sheath supported to said outer case defining a heat shield encapsulating said outer case and being outwardly spaced therefrom, said outer case together with said metal sheath and said inner case defining cavities sandwiching said outer case and receiving leakage heated air from said gas path, whereby said outer case is thermally isolated from the direct heat exchange relative with said gas path and the ambient air adjacent the outer surface of said heat shield and maintaining said outer case at a higher temperature.

2. For a gas turbine engine as claimed in claim 1 wherein said stator vanes are segmented, each of said segments being arcuate in shape and disposed end-to-end to define a ring-like member.

* * * * *